United States Patent [19]

Andersson

[11] 4,131,194
[45] Dec. 26, 1978

[54] SCRAPER BAR ASSEMBLY FOR ENDLESS CONVEYOR BELTS

[75] Inventor: Sven E. Andersson, Chagrin Falls, Ohio

[73] Assignee: Trelleborg Rubber Company, Inc., Solon, Ohio

[21] Appl. No.: 889,186

[22] Filed: Mar. 23, 1978

Related U.S. Application Data

[63] Continuation of Ser. No. 751,792, Dec. 17, 1976, abandoned.

[51] Int. Cl.$^2$ ............................................. B65G 45/00
[52] U.S. Cl. ...................................... 198/497; 198/499
[58] Field of Search .................. 198/497, 499; 74/230; 15/256.5, 256.51, 256.6

[56] References Cited

U.S. PATENT DOCUMENTS

| 3,598,231 | 8/1971 | Matson | 198/499 |
|---|---|---|---|
| 3,674,131 | 7/1972 | Matson | 198/497 |
| 3,994,384 | 11/1976 | Reiter | 198/497 |
| 3,999,649 | 12/1976 | Andersson | 198/499 |

Primary Examiner—Joseph E. Valenza
Attorney, Agent, or Firm—Meyer, Tilberry & Body

[57] ABSTRACT

A scraper assembly is pivotally supported for biased engagement with the outer surface of a moving conveyor belt to clean the surface of the belt. The scraper assembly includes a plurality of scraper elements spaced along the length of an elongate carrier which extends transversely of the side edges of the belt. Each scraper element is removably mounted on the carrier and at an inclined angle with respect to the direction of movement of the conveyor belt to displace material clinging to the surface of the belt outwardly towards the edges of the conveyor belt. The scraper element consists of a resilient body with a fixedly vulcanized assembly profile with an outwardly open undercut groove for a bolt. The undercut groove extends at an inclined angle towards the scraping edges of the scraper element. The elongate carriers of the carrier device have a curved carrying surface facing the scraper elements. The opening edges of the undercut groove abut against this carrying surface for orientation of the groove parallel with the carriers and thereby for orientation of the scraper elements obliquely with respect to the direction of travel of the conveyor belt.

9 Claims, 7 Drawing Figures

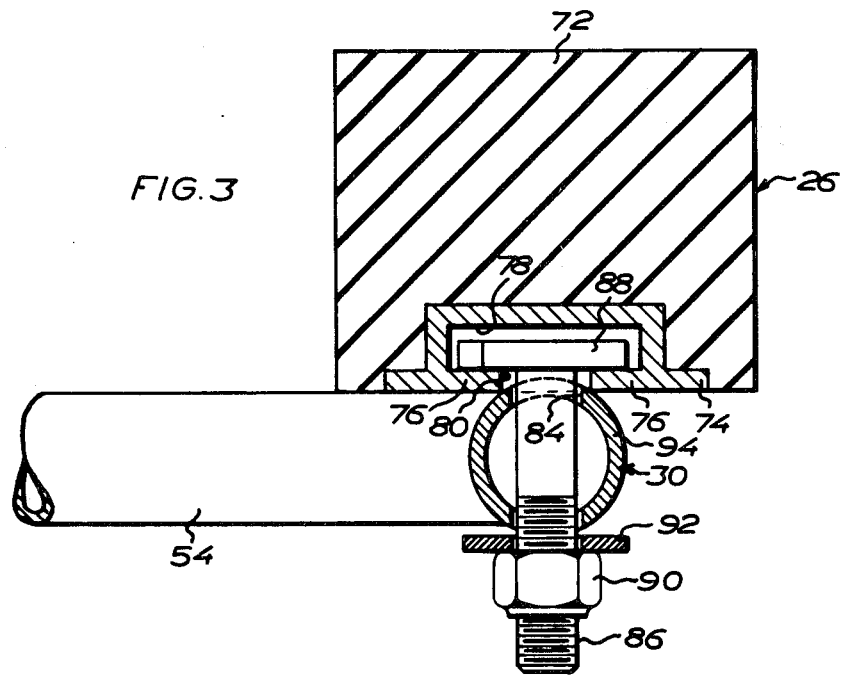
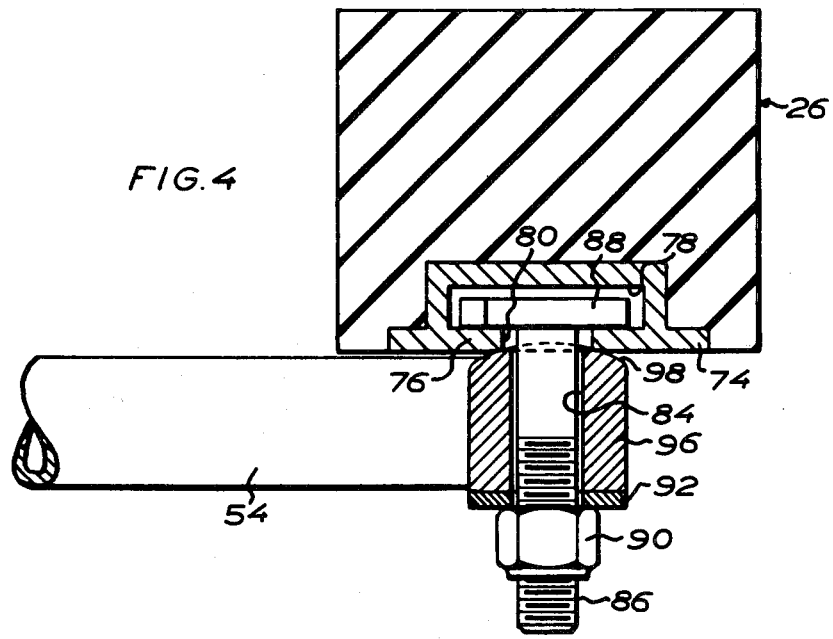

SCRAPER BAR ASSEMBLY FOR ENDLESS CONVEYOR BELTS

This is a continuation of application Ser. No. 571,792 filed Dec. 17, 1976 now abandoned.

DISCLOSURE

The present invention relates to endless conveyor belts and, more particularly, to a scraper assembly for cleaning the surface of an endless conveyor belt. As described in my United States patent application Serial No. 628,388 dated Nov. 3, 1975 now U.S. Pat. No. 3,999,649, it is well known to clean the surface of a conveyor belt by means of inclined scraper elements which, by means of a carrier device, are urged against the surface of the conveyor belt. In my above mentioned United States patent application I have described a mounting assembly for mounting the scraper elements on the carrier device, the mounting assembly making possible individual replacement of the separate scraper elements and also pivoting of the scraper elements with respect to the path of movement of the conveyor belt. The scraper assembly according to my above mentioned United States patent application is highly advantageous and operates satisfactorily in performing scraping functions. However, it has proved that the mounting and replacement of the separate scraper elements is time consuming, and that the apparatus is structurally complicated and expensive to manufacture and assemble in order to obtain a desired orientation of the scraper elements with respect to the direction of belt travel.

In accordance with the present invention, an improved scraper assembly is produced for endless conveyor belts, the assembly comprising a series of scraper elements removably mounted on a carrier member and in which the scraper elements and carrier member are directly interengaged by a cooperable orienting arrangement therebetween. The scraper elements each have at least one scraping edge inclined with respect to the path of movement of the conveyor belt and the scraper elements include a mounting end having a recess extending thereacross and inclined with respect to the scraper edge. The carrier member extends transverse to the side edges of the belt and, preferably, has a curved bearing surface facing the scraper element recesses and against which surface the sides or edges of the recess abut. This orients the recess parallel to the carrier member and thereby orients the scraping edge of the scraper element at the desired angle of incline with respect to the path of movement of the conveyor belt.

Preferably, the scraper elements have T-slots in the mounting end which both define the recess and receive headed bolts by which the elements are attached to the carrier. It is further preferred that the carrier element is a tube or a rod which has transverse through-holes for the passage of the shanks of the bolts and whose curved outer surface or curved outer surface portion forms the above mentioned bearing surface.

An object of the present invention is, therefore, to provide an improved scraper assembly for endless belt conveyors.

Another object of the invention is to provide a structurally simple and reliable arrangement for orientation of the separate scraper elements with respect to the path of movement of the conveyor belt such that the scraper elements assume a predetermined angle of inclination with respect to the path of movement.

A further object of the invention is to provide a structurally simple scraper assembly having removable scraper elements and comprised of a minimum of component parts and which is economical to produce and maintain without sacrificing efficiency in operation.

The present invention and its aspects will be more readily understood from the accompanying drawings which show, in greater detail, two preferred embodiments of the assembly according to the invention but which must not be considered as restricting the scope of the invention.

In the accompanying drawings:

FIG. 3 is a sectional elevation view of the scraper assembly taken along line 3—3 in FIG. 1;

FIG. 4 is a sectional elevation view of another embodiment of a scraper assembly according to the present invention;

Figure 1:
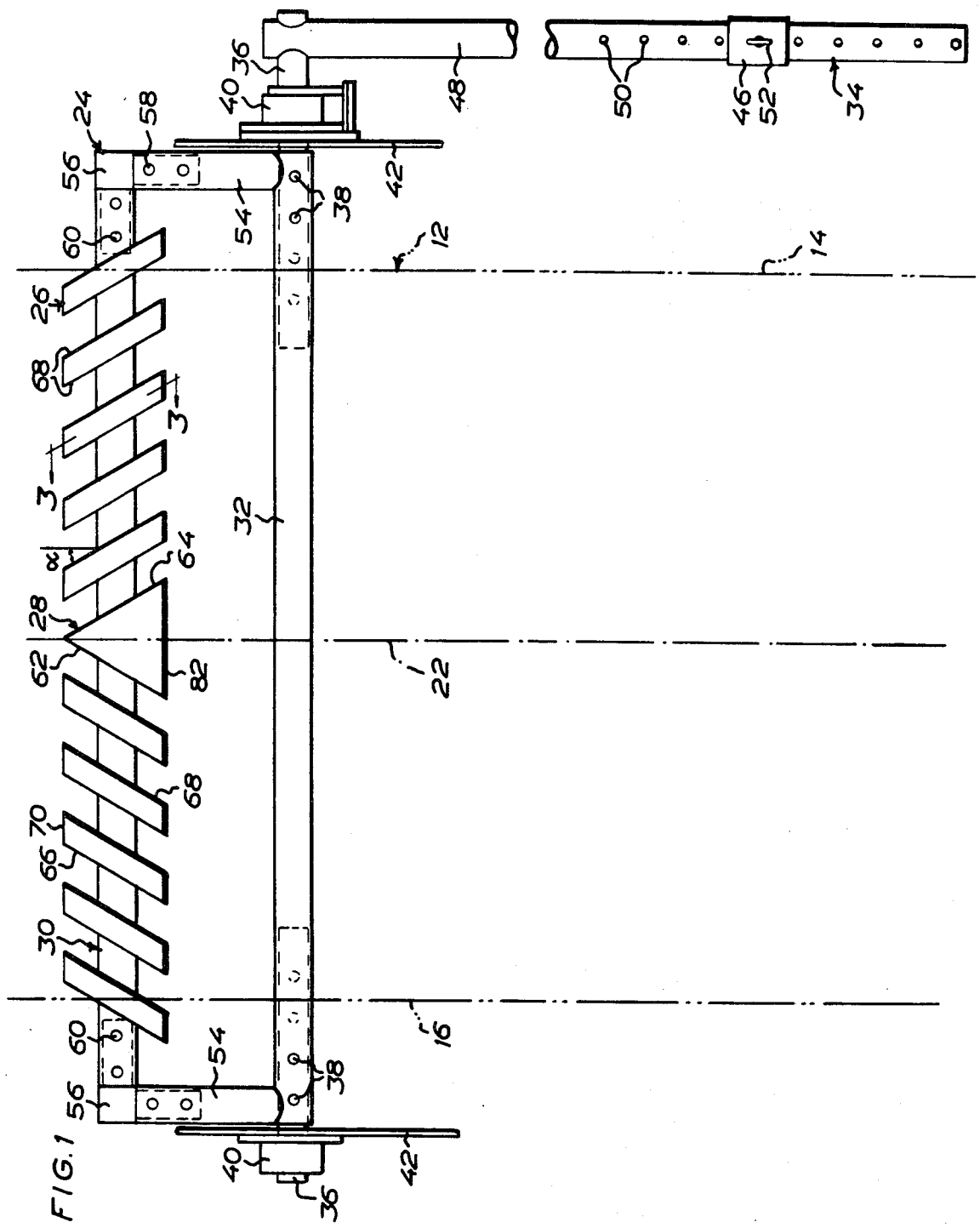
FIG. 1 is a plan view of a scraper assembly according to the present invention.
Figure 2:
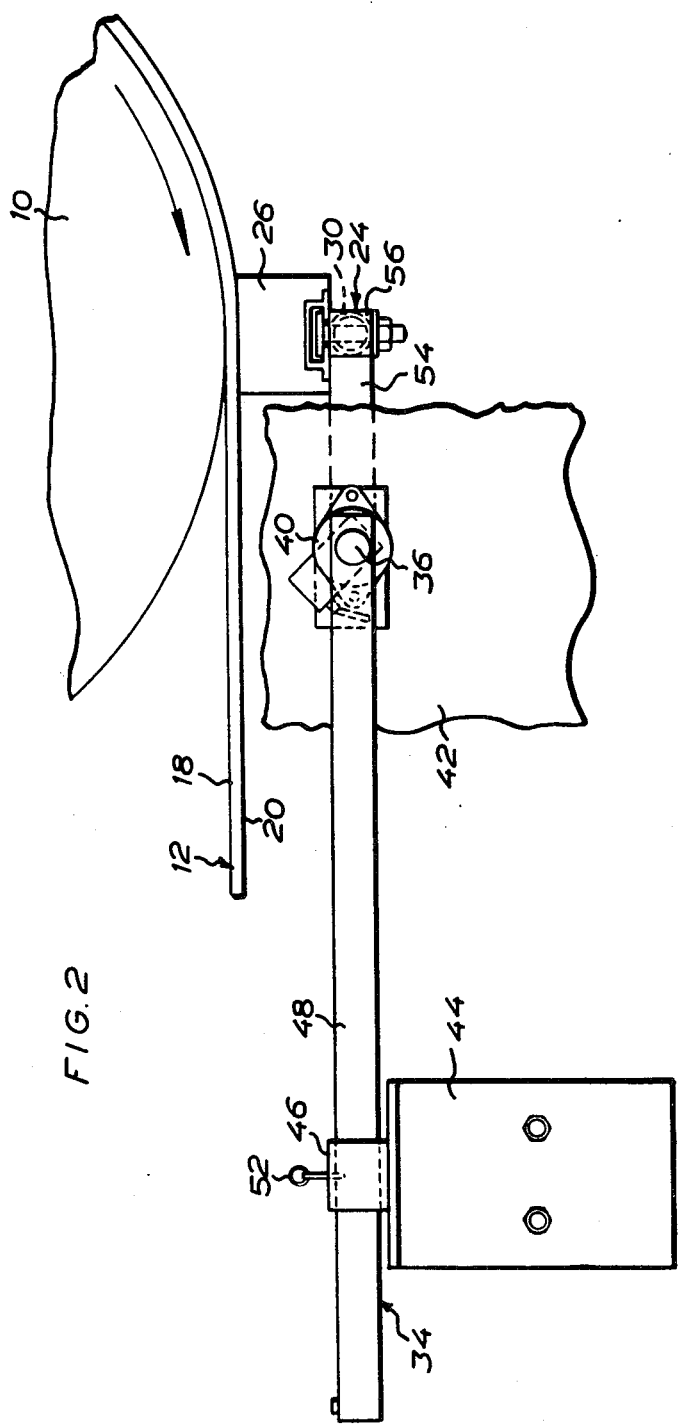
FIG. 2 is a side elevation view of the scraper assembly of FIG. 1.

FIGS. 1 and 2 illustrate a scraper assembly according to the invention in conjunction with a drum 10 and a conveyor belt 12 in a conveyor of the type with endless conveyor belts. As will be apparent from the following description, the scraper assembly according to the invention is not restricted in use to a special type of belt conveyor and consequently the construction and operation of the conveyor is not important for the present invention and has not, therefore, been shown in detail. For facilitating the subsequent description of the invention, the opposing side edges of the conveyor belt 12 have, however, been numbered 14 and 16, whereas the inner and outer surfaces of the conveyor belt in relation to the drum 10 have been numbered 18 and 20, respectively, and a center line 22 has been marked in FIG. 1, the line extending in the longitudinal direction relative to the direction of travel of the belt over the drum 10.

The scraper assembly according to the invention has a pivotal support rod assembly 24 which supports a carrier rod 30 carrying scraper elements 26, 28 for pivotal motion towards and away from the belt 12 about a horizontal shaft 32 which is at right angles to the belt edges 14, 16. Moreover, a counterweight assembly 34 is included in the assembly for biasing the scraper unit for pivotal motion in a direction towards the belt 12. Short journals 36 are inserted in the ends of the tubular shaft 32 and are retained by means of bolts 38. The journals 36 are mounted in bearings 40 which are retained on a positionally fixed upstanding plate 42 which can constitute a part of or be connected to the frame of the conveyor. The counterweight assembly 34 is rigidly mounted at the outer end of the journal to the right in FIG. 1. The counterweight assembly 34 comprises a counterweight 44 which, by means of a fixedly mounted channel 46, hangs to the rod 48 of the counterweight assembly and can be shifted along the rod and fixed in a number of different positions by means of holes 50 in the rod and a locking pin 52. Thus, the shifting of the counterweight 44 along the rod 48 makes possible the controlling of the force by which the scraper elements 26, 28 are urged against the surface 20 of the conveyor belt.

Transverse tubes 54 are fixedly welded at the ends of the tubular shaft 32. These tubes 54 extend at right angles to the shaft 32. Angle members 56 are inserted into the ends of the tubes and are fixed by means of bolts 58. The other limbs of the angle members are inserted into the ends of the tubular carrier rod 30 and are retained on the rod by means of bolts 60. Thus, it is clear that the rod 48 and the rods 54 form, by the intermediary of the shafts 32, 36, a two armed lever for urging the scraper elements 26, 28 against the surface 20 of the conveyor belt 12.

It is apparent from FIG. 1 that the scraper elements on either side of the center line 22 of the conveyor belt are inclined outwardly in a plough-like manner; and that adjacent scraper elements are of such mutual spacing and have such angle of inclination towards the direction of movement of the conveyor belt as represented by the center line 22, that they overlap each other in relation to an imaginary line which bisects the scraper elements and is parallel to the direction of travel of the conveyor belt. Hereby, all portions of the surface 20 will be exposed to the scraping effect of the scraper elements.

The scraper elements on either side of the center line of the belt are, thus, inclined in opposite directions. In order to realize scraping at the center line of the belt, the centrally located scraper element 28 differs from the scraper elements 26 in that the scraper element 28 is triangular and has two effective scraping side edges 62, 64; whereas the scraping elements 26 on either side of the center line 22 have but one effective scraping side edge 66. The rearwardly directed side edge 68 of the scraping elements 26 is not effective as a scraping edge. The forwardly directed planar front edge 70 of the scraper elements 26 acts, however, also as a scraping edge.

Figure 5:
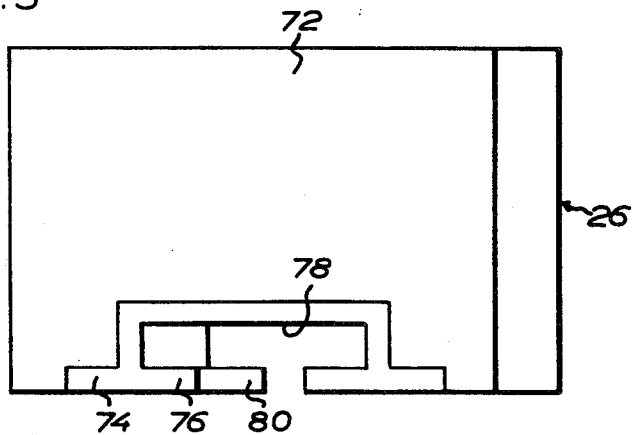
FIG. 5 is a side elevation view of a scraper element for a scraper assembly according to the present invention.
Figure 6:
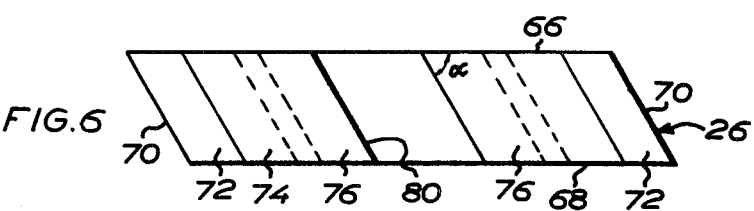
FIG. 6 is a bottom view of the scraper element shown in FIG. 5.

As is apparent from FIGS. 3, 5 and 6, the scraper elements 26 comprise a resilient body 72 which is fixedly vulcanized to a channel-shaped metal member 74 which, by means of edge portions 76, defines an inner undercut groove 78 and an opening 80. As is particularly clearly apparent from FIGS. 5 and 6, the metal member 74 extends at an oblique angle relative to the edges 66, 68 of the scraper element. This is achieved by cutting the scraper elements 26 on an angle with respect to the longitudinal axis of an elongate body whose cross-sectional form corresponds to the section shown in FIG. 3. Thus, the scraper element can have been cut from conventional lifter bar elements normally used as lifters in mill drums. This is a great advantage, since, in the manufacture of the scraper elements, it is possible to use short waste pieces from such lifters. The centrally located scraper element 28 is also manufactured by cutting from such a lifter element, the cutting taking place by symmetrical diagonal cutting in different directions in order that the metal profile 74 be parallel with the rear edge 82 of the scraper element.

Mounting of the different scraper elements on the carrier rod 30 is shown in detail in FIG. 3. As is apparent from this Figure, transverse through holes 84 have been drilled through the carrier rod 30. T-bolts 86 have been passed through these holes. The cross-piece or head 88 of these T-bolts is inserted into the undercut groove 78 and is urged against the inner side of the inwardly directed edge portions 76 on either side of the opening 80 by means of a nut 90 and washer 92 engaging against the underside of the tube 30.

Figure 7:
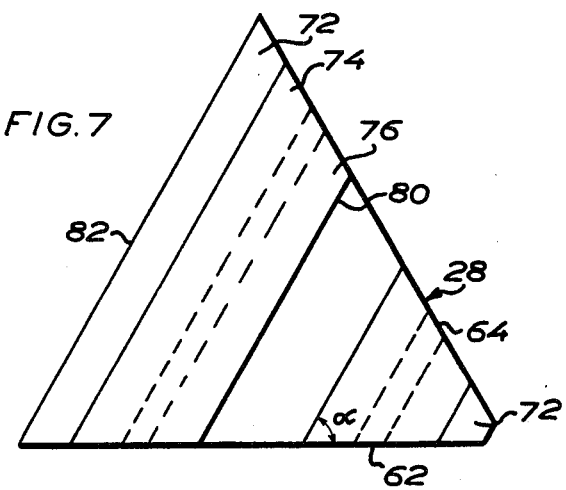
FIG. 7 is a bottom view of a central scraper element for a scraper assembly according to the present invention.

The orientation of the scraper elements 26, 28 relative to the carrier tube 30 is predetermined by the oblique cutting angle α between the effective scraping edges 62, 64, 66 of the scraper elements 26 and 28 and the edge portions 76 defining the respective opening 80, as best seen in FIGS. 1, 6 and 7. Locking of the scraper elements 26, 28 in the predetermined angular position is obtained in that the carrier tube 30, as a result of its curved outer surface 94 will partially project into the opening 80 defined by the edge portions 76, such that the edge portions are urged against this curved surface on either side of the through hole 84, as shown in FIG. 3. Thus, a very exact and reliable tightening and orientation of the scraper elements 26, 28 with respect to the carrier tube 30 is obtained.

The design of the scraper assembly and the mounting of the scraper elements on the scraper bar assembly 24 according to the present invention are highly advantageous, since the assembly requires few parts and nevertheless makes possible an accurate and exact rectification of the scraper elements with respect to the direction of travel of the conveyor belt. Another advantage with the assembly is that the separate scraper elements can easily be removed and replaced without the need to loosen other elements. Thus, it is merely necessary to loosen the nut 90 without fully removing the bolt 86, for if the nut 90 is screwed out somewhat it is possible to shift the scraper elements 26, 28 laterally so that they are released from the head 88 of the T-bolt 86.

In the embodiment according to FIGS. 1, 2 and 3, a carrier rod 30 in the form of a tube has been utilized. However, the essential feature for the invention is merely that the carrier rod presents a curved surface towards the scraper elements 26, 28 so that the curved surface of the carrier rod partially penetrates the opening 80 defined by the inwardly directed edges of the metal profile 74, so that a linear contact is obtained between the edges of the opening and the curved surface of the carrier rod. In FIG. 4 there is shown another embodiment of the carrier rod, in which the carrier rod is in the form of a solid rod 96 of substantially quadratic cross section, having a curved top surface 98 facing the scraper elements 26, 28. Surface 98 has a radius of curvature such that the rod, like the tube 30 in FIG. 3, partially penetrates the opening 80. Thus, a linear contact is obtained between the edges of the opening 80 and the curved surface 98.

The curved surfaces 94 and 98 on the tube 30 and the rod 96, respectively, in the embodiments according to FIGS. 3 and 4 have a further advantage apart from their orientating effect; namely, that the curved surfaces divert the flow path of material scraped from the surface 20 of the belt 12 thus to reduce the possibility of material adhering to the tube 30 or the rod 96. In this respect, the curved surfaces 94 and 98 form chutes for the material which has been scraped loose.

While considerable emphasis has been placed herein on the specific structures and structural interrelationships between component parts of the preferred embodiments shown, many changes and modifications will be obvious to those skilled in the art and can be made without departing from the principles of the present invention. In this respect, for example, it will be appreciated that the surface of the carrier member engaged by the side edges of the opening into the T-slot of a scraper element does not have to be curved to provide the positioning function. There are many contours other than a curved surface which will provide angularly related surface portions such as are provided by circumferentially spaced portions of a curved surface. For example, such a surface relationship can be provided by angularly intersecting planar surfaces extending upwardly and inwardly of the carrier member to intersect along a ridge between the opposite ends of the carrier member. Additionally, it will be appreciated that the surface portions engaged by the edges of the opening of the T-slot of a scraper element do not have to be longitudinally coextensive with the carrier member, but rather can be provided at intermittent locations along the length thereof corresponding to the positions of the scraper elements. Still further, while it is preferred to employ a T-slot for attaching the scraper elements and for providing parallel edges cooperable with the carrier member for positioning and orienting the scraper elements as herein described, it will be appreciated that other mounting arrangements and positioning configurations can be employed. For example, the scraper element could be provided with any recess configuration in the bottom surfaces thereof which will provide parallel sides to engage angularly related surface portions of the carrier member, and a threaded bolt could extend upwardly through the carrier member and into a threaded recess in the scraper element.

As many embodiments of the present invention can be made, and as many changes can be made in the embodiments herein illustrated and described, it is to be distinctly understood that the foregoing descriptive matter is to be interpreted merely as illustrative of the present invention and not as a limitation.

What is claimed is:

1. A scraper assembly for an endless conveyor belt having a belt surface and opposite belt side edges comprising, a plurality of scraper elements having belt engaging ends and mounting ends, said scraper elements each including a mounting plate providing said mounting end and a body of rubber directly attached to said mounting plate and providing said belt engaging end, means including a carrier member extending transverse to said belt side edges and supporting said scraper elements for said belt engaging ends to engage said belt surface, said carrier member having a surface extending in said transverse direction, said mounting plates of said scraper elements having mounting recesses therein, said mounting recesses having parallel opposite sides extending in said transverse direction and engaging longitudinally spaced portions of said carrier member surface, means received within the recesses for coacting with the surfaces forming each recess to removably mount each scraper element on said carrier member against said surface thereof, and said belt engaging ends of said scraper elements having parallel belt engaging scraper edges oblique to said parallel opposite sides of said mounting recess.

2. The scraper assembly according to claim 1, wherein said carrier member is circular in cross section and said sides of said mounting recesses engage circumferentially spaced portions of the outer surface of said carrier member.

3. The scraper assembly according to claim 2, wherein said carrier member is tubular.

4. The scraper assembly according to claim 1, wherein said carrier member in cross section has an arcuate portion defining said carrier member surface, said sides of said mounting recesses engaging circumferentially spaced portions of said arcuate surface portion.

5. A scraper assembly for an endless conveyor belt having a belt surface and opposite belt side edges comprising, a plurality of scraper elements having belt engaging ends and mounting ends, means including a carrier member extending transverse to said belt side edges and supporting said scraper elements for said belt engaging ends to engage said belt surface, said carrier member having a surface extending in said transverse direction, said mounting ends of said scraper elements having mounting recesses therein, said mounting recesses having parallel opposite sides extending in said transverse direction and engaging longitudinally spaced portions of said carrier member surface, means removably mounting each scraper element on said carrier member against said surface thereof, said belt engaging ends of said scraper elements having parallel belt engaging scraper edges oblique to said parallel opposite sides of said mounting recesses, and said scraper elements each including a metal mounting plate having a T-slot therein and a body of rubber attached to said mounting plate, said T-slot providing said mounting recess and said body providing said belt engaging end.

6. A scraper assembly for an endless conveyor belt having a belt surface and opposite belt side edges comprising, a plurality of scraper elements each having a belt engaging end and a mounting end, said belt engaging end including at least one scraper edge, said mounting end having a T-slot therethrough and said T-slot including an opening having parallel side edges inclined at a given angle with respect to said one scraper edge, means including a carrier member supporting each said scraper element for said belt engaging end to engage said belt surface, said carrier member extending transverse to said belt side edges and including angularly related surface portions along the length thereof engaging said opposite side edges of said opening of each said scraper element to position said one scraper edge at said given angle with respect to said belt side edges, and bolt means removably mounting each said scraper element on said carrier member against said surface portions, said carrier member being circular in cross section and said side edges of said opening engaging circumferentially spaced portions of the outer surface of said carrier member.

7. A scraper assembly for an endless conveyor belt having a belt surface and opposite belt side edges comprising, a plurality of scraper elements each having a belt engaging end and a mounting end, said belt engaging end including at least one scraper edge, said mounting end having a T-slot therethrough and said T-slot including an opening having parallel side edges inclined at a given angle with respect to said one scraper edge, means including a carrier member supporting each said scraper element for said belt engaging end to engage said belt surface, said carrier member extending transverse to said belt side edges and including angularly related surface portions along the length thereof engaging said opposite side edges of said opening of each said scraper element to position said one scraper edge at said given angle with respect to said belt side edges, and bolt means removably mounting each said scraper element on said carrier member against said surface portions, said carrier member in cross section having an outer surface including an arcuate surface portion, and said side edges of said opening engaging circumferentially spaced portions of said arcuate surface portion.

8. A scraper assembly for an endless conveyor belt having a belt surface and opposite belt side edges comprising, a plurality of scraper elements each having a belt engaging end and a mounting end, said belt engaging end including at least one scraper edge, said mounting end having a T-slot therethrough and said T-slot including an opening having parallel side edges inclined at a given angle with respect to said one scraper edge, means including a carrier member supporting each said scraper element for said belt engaging end to engage said belt surface, said carrier member extending transverse to said belt side edges and including angularly related surface portions along the length thereof engaging said opposite side edges of said opening of each said scraper element to position said one scraper edge at said given angle with respect to said belt side edges, and bolt means removably mounting each said scraper element on said carrier member against said surface portions, said scraper elements including a metal mounting plate having said T-slot therein and a body of rubber attached to said mounting plate and providing said belt engaging end, said carrier member being circular in cross section and said side edges of said opening engaging circumferentially spaced portions of the outer surface of said carrier member, said carrier member having a bolt hole therethrough for each said scraper element, and said bolt means including a bolt having a head received in said T-slot and a shank extending through said T-slot opening and said bolt hole.

9. A scraper assembly for an endless conveyor belt having a belt surface and opposite belt side edges comprising, a plurality of scraper elements each having a belt engaging end and a mounting end, said belt engaging end including at least one scraper edge, said mounting end having a T-slot therethrough and said T-slot including an opening having parallel side edges inclined at a given angle with respect to said one scraper edge, means including a carrier member supporting each said scraper element for said belt engaging end to engage said belt surface, said carrier member extending transverse to said belt side edges and including angularly related surface portions along the length thereof engaging said opposite side edges to said opening of each said scraper element to position said one scraper edge at said given angle with respect to said belt side edges, and bolt means removably mounting each said scraper element on said carrier member against said surface portions, said scraper elements including a metal mounting plate having said T-slot therein and a body of rubber attached to said mounting plate and providing said belt engaging end, said carrier member being a solid rod which in cross section has an outer surface including an arcuate surface portion, said side edges of said opening engaging circumferentially spaced portions of said arcuate surface portion, said carrier member having a bolt hole therethrough for each said scraper element, and said bolt means including a bolt having a head received in said T-slot and a shank extending through said T-slot opening and said bolt hole.

* * * * *